Figure 1:
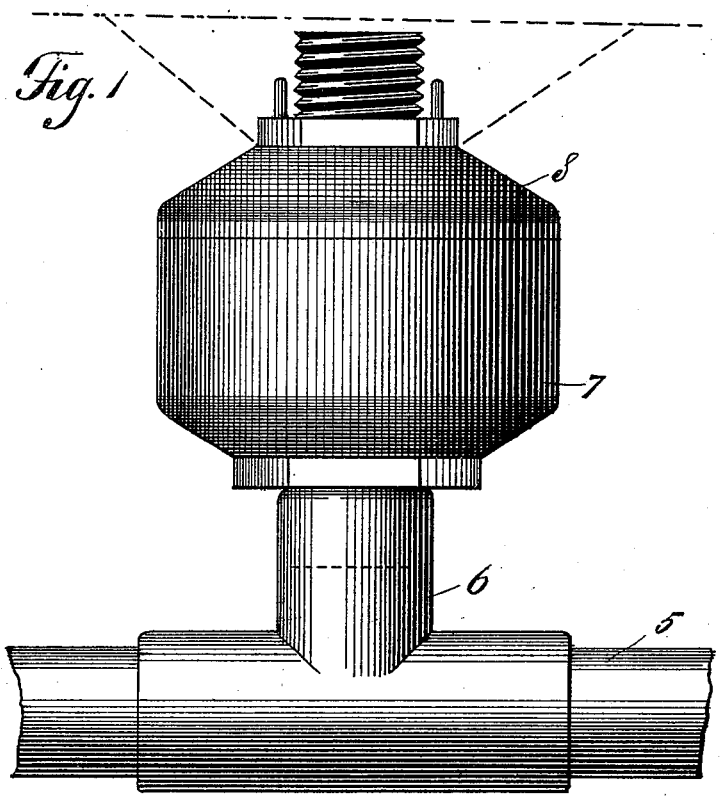

No. 681,420. Patented Aug. 27, 1901.
H. L. JORDAN.
HYDRANT OR OTHER WATER PIPE COUPLING.
(Application filed May 7, 1901.)
(No Model.) 2 Sheets—Sheet 1.

WITNESSES: INVENTOR
Hugh Luckett Jordan
BY
ATTORNEYS

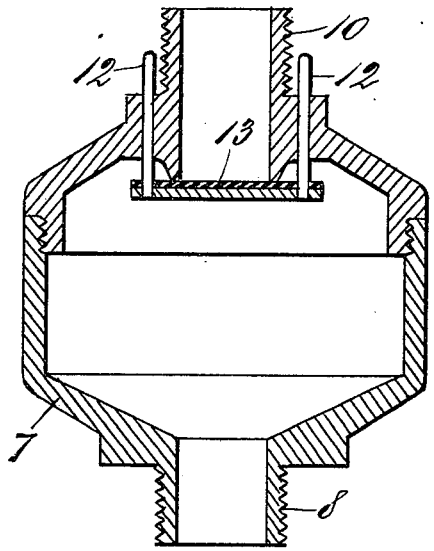
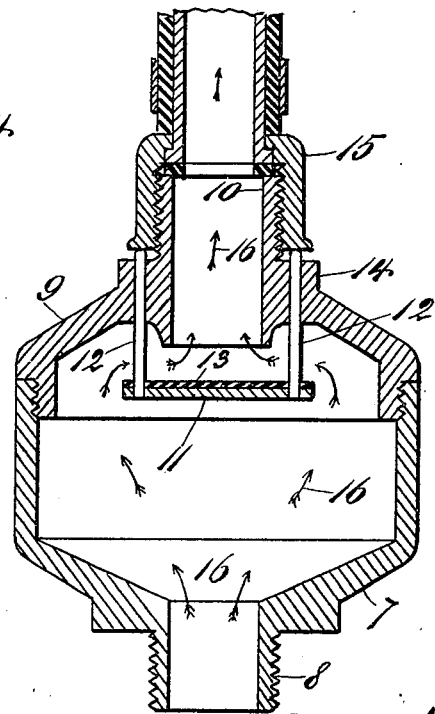

UNITED STATES PATENT OFFICE.

HUGH LUCKETT JORDAN, OF SANTA PAULA, CALIFORNIA.

HYDRANT OR OTHER WATER-PIPE COUPLING.

SPECIFICATION forming part of Letters Patent No. 681,420, dated August 27, 1901.

Application filed May 7, 1901. Serial No. 59,173. (No model.)

*To all whom it may concern:*

Be it known that I, HUGH LUCKETT JORDAN, a citizen of the United States, residing at Santa Paula, in the county of Ventura and State of California, have invented certain new and useful Improvements in Hydrant or other Water-Pipe Couplings, of which the following is a full and complete specification, such as will enable those skilled in the art to which it appertains to make and use the same.

This invention relates to hydrant or other water-pipe couplings for use in connecting a hose with a water-supply pipe; and the object thereof is to provide an improved device of this class which is particularly adapted for use as a connection for hose-pipes used in sprinkling lawns, but which may be used wherever such devices are required.

The invention is fully disclosed in the following specification, of which the accompanying drawings form a part, in which the separate parts of my improvement are designated by the same reference characters in each of the views, and in which—

Figure 2:
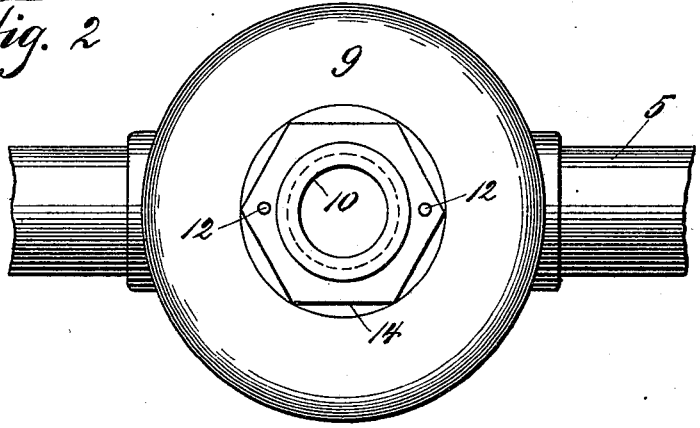

Figure 1 is a side view of my improved hydrant or water-pipe coupling; Fig. 2, a plan view thereof; Fig. 3, a vertical section of the coupling; and Fig. 4, a view similar to Fig. 3, showing the parts in a different position.

In the drawings forming part of this specification I have shown at 5 an ordinary water-supply pipe, which is provided with an elbow-coupling 6, and in the practice of my invention I provide a device of the class specified comprising a casing 7, having a bottom screw-threaded member 8, adapted to be screwed into the coupling 6 and provided with a detachable top 9, having a central vertical screw-threaded tubular member 10, with which in practice an ordinary hose may be connected in the usual manner. I also provide a vertically-movable valve-plate 11, which is placed within the removable top 9 of the casing 7 and adapted to close the passage through the tubular screw-threaded member 10, and this plate is provided with vertically-arranged pins 12, which pass through the detachable top 9 of the casing 7 closely adjacent to the screw-threaded member 10 and which are held in said top 9 by friction or in any desired manner, and on the valve-plate 11 is placed a packing-disk 13 of any desired material. The detachable top 9 of the casing 7 is provided around the base of the screw-threaded tubular member 10 with an angular collar 14, through which the pins 12 pass and by means of which the detachable top 9 may be screwed off or onto the casing 7 whenever desired. I have also shown in Fig. 4 a hose-coupling 15, which is adapted to be screwed onto the tubular screw-threaded member 10, and in this operation the pins 12 and valve-plate 11 are forced downwardly, as shown in Fig. 4, and the water is free to pass from the pipe 5 into and through the casing 7, around the valve-plate 11, and through the hose and hose-coupling, as indicated by the arrows 16, and when the hose or hose-coupling is detached the pressure of the water within the casing 7 will force the valve-plate 11 upwardly and cause the same to close the passage through the tubular member 10, as will be readily understood.

It will be understood that in practice the pipe 5 is placed under ground in the usual manner, as is also the casing 7, the top of said casing being arranged so that it comes about level with the surface of the ground, and any suitable cover may be provided therefor when the apparatus is not in use.

Having fully described my invention, what I claim as new, and desire to secure by Letters Patent, is—

1. The herein-described hydrant or water-pipe coupling comprising a casing provided with a detachable top having a screw-threaded tubular member, with which a hose is adapted to be connected, said detachable top being also provided with pins which pass therethrough adjacent to said tubular member, and a valve-plate connected with the inner ends thereof and adapted to close said tubular member, substantially as shown and described.

2. The herein-described hydrant or water-pipe coupling comprising a casing provided with a detachable top having a screw-threaded tubular member, with which a hose is adapted to be connected, said detachable top being also provided with pins which pass therethrough adjacent to said tubular member, and a valve-plate connected with the inner ends thereof and adapted to close said tubular member, said pins and valve-plate being adapted to be operated by connecting a hose-coupling with said tubular member, substantially as shown and described.

In testimony that I claim the foregoing as my invention I have signed my name, in presence of the subscribing witnesses, this 29th day of April, 1901.

HUGH LUCKETT JORDAN.

Witnesses:
H. D. SOY,
J. C. STRONG.